United States Patent [19]

Schnettler et al.

[11] 3,888,861
[45] June 10, 1975

[54] 3-[2-(4-SUBSTITUTED-PIPERAZIN-1-YL)ETHYL]INDOLES

[75] Inventors: Richard A. Schnettler, Brown Deer; John T. Suh, Mequon, both of Wis.

[73] Assignee: Colgate-Palmolive Company, New York, N.Y.

[22] Filed: Jan. 7, 1974

[21] Appl. No.: 431,106

[52] U.S. Cl. .......................... 260/268 BC; 424/250
[51] Int. Cl. ............................................ C07d 51/70
[58] Field of Search ......................... 260/268 BC

[56] References Cited
UNITED STATES PATENTS

| | | |
|---|---|---|
| 3,135,794 | 6/1964 | Archer .................. 260/268 BC |
| 3,146,234 | 8/1964 | Archer .................. 260/268 BC |
| 3,501,465 | 3/1970 | Shen et al. ............. 260/268 BC |
| 3,562,278 | 2/1971 | Archer .................. 260/268 BC |
| 3,751,416 | 8/1973 | Allen et al. ............ 260/268 BC |
| 3,751,417 | 8/1973 | Allen et al. ............ 260/268 BC |
| 3,810,897 | 5/1924 | Phillippe ............... 260/268 BC |

OTHER PUBLICATIONS

Istituto Luso Farmaco d'Italia S.R.L. Chemical Abstracts Vol. 68, 69041K, (1968).
Laskowski, Stanley C., Chemical Abstracts Vol. 72, 43733V, (1970).

*Primary Examiner*—Donald G. Daus
*Assistant Examiner*—Jose Tovar
*Attorney, Agent, or Firm*—T. F. Kryshak; M. L. Youngs

[57] ABSTRACT

The compounds are 3-[2-(4-substituted-piperazin-1-yl)-ethyl]indoles which are central nervous system depressants, antihypertensive agents and adrenergic β-receptor antagonists. Representative compounds disclosed are 3-[2-(4-piperonoylpiperazin-1-yl)ethyl]indole, 3-[2-(4-benzoylpiperazin-1-yl)-ethyl]indole, and 3-[2-(4-piperonylpiperazine-1-yl)ethyl]-indole.

9 Claims, No Drawings

3-[2-(4-SUBSTITUTED-PIPERAZIN-1-YL)ETHYL]INDOLES

DESCRIPTION OF THE INVENTION

The compounds of the present invention may be represented by the following formula:

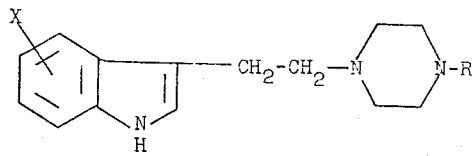

in which R is 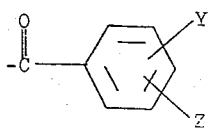

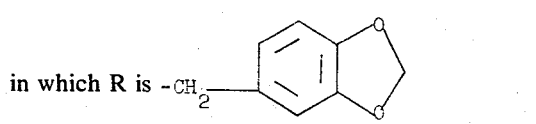; and

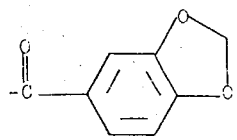;

and X, Y and Z are hydrogen, a halogen such as chloro, bromo or fluoro, trifluoromethyl, hydroxy and lower alkoxy of one to four carbon atoms such as methoxy, ethoxy and propoxy.

In the preferred method of preparation, a 3-indolelower-alkyl halide is dissolved in a solvent such as benzene, and a suitable piperazine added. The resulting mixture is then heated at reflux to form the desired compound. The compound thus obtained may be purified by a recrystallization from suitable solvents.

The preferred practice may be illustrated as follows:

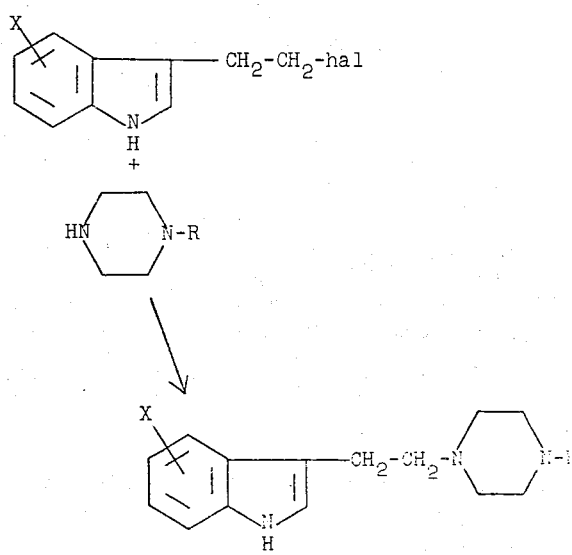

in which X and R are as previously defined.

The basic starting materials for the preparation of the compounds of the invention are 3-indolyl-lower-alkyl-halides of the formula:

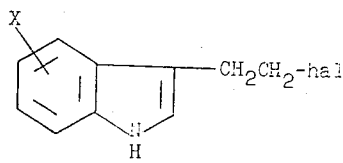

in which X is as previously described. These compounds are known or can be prepared by known methods. Representative of these compounds are the following:

3-(2-Bromoethyl)indole;
5-Chloro-3-(2-bromoethyl)indole;
5-Methoxy-3-(2-bromoethyl)indole;
6-Trifluoromethyl-3-(2-bromoethyl)indole; and
7-Fluoro-3-(2-bromoethyl)indole.

Representative of the substituted piperazines which may be employed in the described process are the following:

N-piperonoylpiperazine,
N-benzoylpiperazine,
N-piperonylpiperazine,
N-3,4-dihydroxybenzoylpiperazine, and
N-3,4-dichlorobenzylpiperazine.

Representative of the final compounds which may be prepared by the described process are the following:

3-[2-(4-Piperonoylpiperazin-1-yl)ethyl]indole,
5-chloro-3-[2-(4-piperonoylpiperazin-1-yl)ethyl]indole,
3-[2-(4-Benzoylpiperazin-1yl)ethyl]indole,
7-Fluoro-3-[2-(4-benzoylpiperazin-1-yl)ethyl]indole,
3-[2-(4-Piperonylpiperazin-1-yl)ethyl]indole,
5-Methoxy-3-[2-(4-piperonylpiperazin-1-yl)ethyl]indole, and
3-{2-[4-(3,4-Dimethoxybenzyl)piperazin-1yl]ethyl}indole.

The compounds of the present invention, as well as their acid addition salts, possess pharmaceutical utility as central nervous system depressants and antihypertensive agents. In addition, they appear to be potent adrenergic $\beta$-receptor antagonists.

In behavioral screening tests in mice the compounds 3-[2-(4-piperonoylpiperazin-1-yl)ethyl]indole, 3-[2-(4-benzoylpiperazin-1-yl)ethyl]indole, and 3-[2-(4-piperonylpiperazin-1-yl)ethyl]indole exhibit a marked central nervous system depression. The behavior of animals receiving 100–300 mg/kg of the compounds intraperitoneally in the form of a 5% acacia suspension were characterized by decreased awareness and mood depression. As a result of the behavioral tests, the compounds were found to have oral $LD_{50}$'s of at least 200 mg/kg. The behavioral tests were conducted in accordance with the procedure set forth by Irwin in "Animal and Clinical Pharmacologic Techniques in Drug Evaluation," J. H. Nodine and P. E. Siegler, Ed., Year Book Publishers, Inc., 1964, pp. 36–54.

The compounds were also found to lower blood pressure significantly when administered in 3 and 10 mg/kg intravenous doses to the vagotomized, anesthetized cat or dog preparation which is a standard preparation for testing antihypertensive activity.

The acid addition salts of the compounds may be prepared by treating the free base in a suitable solvent with an organic or inorganic acid. Representative of such acids are hydrochloric, phosphoric, nitric, sulfuric, maleic, citric, ascorbic, methanesulfonic and succinic acid.

The compounds are normally employed in the form of their non-toxic, pharmaceutical acid addition salts, which may be combined with pharmaceutical diluents such as flavoring agents and the like to form conventional unit dosage forms such as capsules, tablets or parenteral solutions. Generally such dosage forms will contain 50–200 mg. of the active ingredient. The total dose of the compound to be administered daily will normally not exceed 50 mg/kg of body weight.

The following examples further illustrate the practice of the present invention:

EXAMPLE 1

3-[2-(4-Piperonoylpiperazin-1-yl)ethyl]indole

A mixture of 1.7 g. (0.0064 mole) of 3-(2-bromoethyl)indole and 3.0 g. (0.0128 mole) of N-piperonoylpiperazine in 100 ml. of anhydrous benzene is refluxed for 18 hours and cooled. The solids are filtered, the solvent distilled and the residual oil chromatographed over silica gel (ethyl acetate/isopropyl alcohol, 9:1) to afford 2.0 g. of a waxy white solid ($R_f = 0.55$) which is recrystallized from ethyl acetate/n-heptane to afford 1.4 g. of 3-[2-(4-piperonoylpiperazin-1-yl)ethyl]indole as an off-white powder, m.p. 124°–126.5°.

Anal. Calcd. for $C_{22}H_{22}N_3O_3$: C, 69.99; H, 6.14; N, 11.14. Found: C, 69.98; H, 6.27; N, 10.87.

EXAMPLE 2

3-[2-(4-Benzoylpiperazin-1-yl)ethyl]indole

A mixture of 3.9 g. (0.014 mole) of 3-(2-bromoethyl)indole and 5.3 g. (0.028 mole) of N-benzoylpiperazine in 100 ml. of benzene is refluxed for 20 hours and cooled. The solids are filtered, the solvent evaporated and the residual oil chromatographed over 100 g. of silica gel (90% ethyl acetate:10% isopropyl alcohol) to afford 4.9 g. of a viscous yellow oil ($R_f = 0.75$). The oil is triturated in hot cyclohexane, the solids filtered and recrystallized from benzene/n-heptane to afford 2.6 g. of 3-[2-(4-benzoylpiperazin-1-yl)ethyl]indole as a beige powder, m.p. 121°–122.5°.

Anal. Calcd. for $C_{21}H_{23}N_3O$: C, 75.65; H, 6.95; N, 12.60. Found: C, 75.72; H, 7.00; N, 12.61.

EXAMPLE 3

3-[2-(4-Piperonylpiperazin-1-yl)ethyl]indole

A slurry of 5.0 g. (0.017 mole) of 3-(2-bromoethyl)indole, 3.7 g. (0.017 mole) of N-piperonylpiperazine and 4.3 g. (0.051 mole) of sodium bicarbonate are refluxed in 50 ml. ethyl alcohol for 20 hours. The mixture is cooled, poured into 500 ml. water and extracted with ethyl acetate, washed with water and dried. Evaporation of the solvent gives an oil which is chromatographed over silica gel (ethyl acetate) to give a beige solid which on recrystallization from ethyl acetate:hexane gives 3-[2-(4-piperonylpiperazin-1-yl)ethyl]indole as a white solid, m.p. 105°–106.5°.

Anal. Calcd. for $C_{22}H_{25}N_3O_2$: C, 72.69; H, 6.93; N, 11.57. Found: C, 72.57; H, 6.96; N, 11.48.

We claim:

1. A compound selected from compounds of the formula

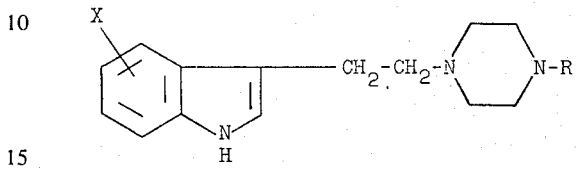

in which R is

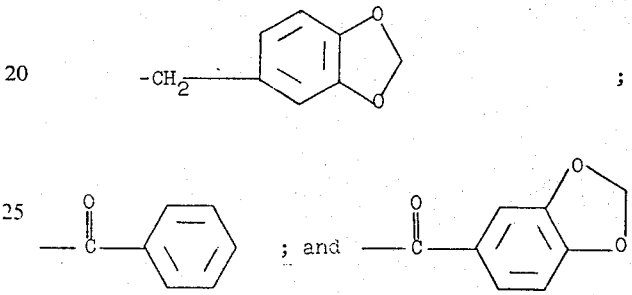

and X is hydrogen, halogen, trifluoromethyl, or lower alkoxy of one to four carbon atoms, and pharmaceutically acceptable acid addition salts thereof.

2. A compound of claim 1 in which X is hydrogen.
3. A compound of claim 1 in which X is halogen.
4. A compound of claim 1 in which R is

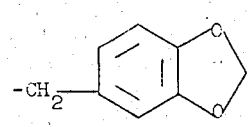

5. A compound of claim 1 in which R is

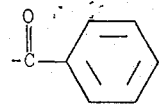

6. A compound of claim 1 in which R is

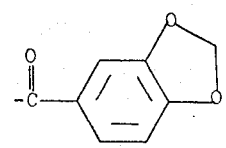

7. The compound of claim 1 which is 3-[2-(4-piperonoyl-piperazin-1-yl)ethyl]indole.
8. The compound of claim 1 which is 3-[2-(4-benzoylpiperazin-1-yl)ethyl]indole.
9. The compound of claim 1 which is 3-[2-(4-piperonly-piperazin-1-yl)ethyl]indole.

* * * * *